United States Patent
Zhao et al.

(10) Patent No.: US 11,507,082 B2
(45) Date of Patent: Nov. 22, 2022

(54) QUALITY OF EXPERIENCE (QOE) MANAGEMENT FOR VEHICLE CONTROL SYSTEMS

(71) Applicant: TOYOTA JIDOSHA KABUSHIKI KAISHA, Toyota (JP)

(72) Inventors: Yecheng Zhao, Mountain View, CA (US); Baekgyu Kim, Mountain View, CA (US); Roger Melen, Mountain View, CA (US)

( * ) Notice: Subject to any disclaimer, the term of this patent is extended or adjusted under 35 U.S.C. 154(b) by 451 days.

(21) Appl. No.: 16/364,958

(22) Filed: Mar. 26, 2019

(65) Prior Publication Data
US 2020/0310413 A1   Oct. 1, 2020

(51) Int. Cl.
G05D 1/00 (2006.01)
H04W 4/40 (2018.01)
H04W 28/24 (2009.01)

(52) U.S. Cl.
CPC ......... *G05D 1/0022* (2013.01); *G05D 1/0088* (2013.01); *H04W 4/40* (2018.02); *H04W 28/24* (2013.01); *G05D 2201/0213* (2013.01)

(58) Field of Classification Search
CPC .............. G05D 1/0022; G05D 1/0088; G05D 2201/0213; H04W 4/40; H04W 28/24
See application file for complete search history.

(56) References Cited

U.S. PATENT DOCUMENTS

| 11,034,361 B2 * | 6/2021 | Boss ............. G05D 1/0088 |
| 2014/0142787 A1 * | 5/2014 | Tillotson ......... H04K 3/224 701/3 |
| 2017/0288886 A1 * | 10/2017 | Atari ............ H04L 65/1063 |
| 2018/0245932 A1 * | 8/2018 | Glasgow .......... G08G 1/012 |
| 2018/0338001 A1 | 11/2018 | Pereira Cabral et al. |
| 2019/0171208 A1 * | 6/2019 | Magalhaes de Matos ........ G05D 1/0022 |
| 2019/0354111 A1 * | 11/2019 | Cheng .......... G05D 1/0027 |
| 2020/0164895 A1 * | 5/2020 | Boss ............ G05D 1/0088 |

FOREIGN PATENT DOCUMENTS

WO   2018019394   2/2018

OTHER PUBLICATIONS

Villas et al., "Real-time path planning to prevent traffic jam through an intelligent transportation system", Jun. 1, 2016, 2 016 IEEE Symposium on Computers and Communication (ISCC), 726-731 (Year: 2016).*
EPO, International Search Report and Written Opinion for International Patent Application No. PCT/US2020/024941, dated Jun. 24, 2020, 15 pages.

* cited by examiner

*Primary Examiner* — Russell Frejd
*Assistant Examiner* — Tarek Elarabi
(74) *Attorney, Agent, or Firm* — Burbage Law, P.C.; Jon-Michael Burbage

(57) ABSTRACT

The disclosure includes embodiments for managing a Quality of Experience (QoE) level experienced by a connected vehicle. In some embodiments, a method for the connected vehicle includes receiving a Vehicle-to-Everything (V2X) message that includes a management decision for the connected vehicle. The management decision is made based at least on a QoE status in a geographic location of the connected vehicle. The method includes modifying an operation of a vehicle control system of the connected vehicle to implement the management decision so that a QoE level experienced by the connected vehicle is improved.

20 Claims, 12 Drawing Sheets

QUALITY OF EXPERIENCE (QOE) MANAGEMENT FOR VEHICLE CONTROL SYSTEMS

BACKGROUND

The specification relates to managing quality of experience (QoE) for a vehicle control system. In some embodiments, the specification relates to managing QoE for a vehicle control system of a connected vehicle.

Various services provided to vehicles are time sensitive. For example, with respect to services such as high-definition (HD) map creation and distribution, Vehicle-to-Cloud (V2Cloud) cruise assistance and cloud-server (or edge-server) assisted platooning, up-to-date information needs to be delivered from a cloud server or an edge server to the vehicles in a timely fashion. Otherwise, QoE of the vehicles that depend on these services may be downgraded by outdated information.

SUMMARY

One general aspect of embodiments described herein includes a computer program product including a non-transitory memory of an onboard vehicle computer system of a connected vehicle storing computer-executable code that, when executed by a processor, causes the processor to: receive a Vehicle-to-Everything (V2X) message that includes a management decision for the connected vehicle, where the management decision is made based at least on a detection of a QoE failure of a requested service and a workload level for the requested service in a geographic location of the connected vehicle; and modify an operation of a vehicle control system of the connected vehicle to implement the management decision so that the vehicle control system operates in a manner that minimizes the workload level for the requested service in the geographic location and improves a QoE level experienced by the connected vehicle. Other embodiments of this aspect include corresponding computer systems, apparatus, and computer programs recorded on one or more computer storage devices, each configured to perform the actions of the methods.

Implementations may include one or more of the following features. The computer program product where the management decision is configured to tune one or more software settings of the vehicle control system so that the vehicle control system operates optimally based on one or more computing resources available on a navigation route of the connected vehicle. The computer program product where the management decision is configured to perform a routing management on the connected vehicle to optimize the QoE level. The computer program product where the management decision is configured to select the connected vehicle to provide the requested service based on one or more priority factors so that a potential safety risk in a roadway environment is reduced. Implementations of the described techniques may include hardware, a method or process, or computer software on a computer-accessible medium.

One general aspect includes a method for a connected vehicle, including: receiving a V2X message that includes a management decision for the connected vehicle, where the management decision is made based at least on a QoE status in a geographic location of the connected vehicle; and modifying an operation of a vehicle control system of the connected vehicle to implement the management decision so that a QoE level experienced by the connected vehicle is improved. Other embodiments of this aspect include corresponding computer systems, apparatus, and computer programs recorded on one or more computer storage devices, each configured to perform the actions of the methods.

Implementations may include one or more of the following features. The method where the management decision is made further based at least on one or more of a workload level of a requested service and a traffic condition in the geographic location. The method where the management decision is configured to tune one or more software settings of the vehicle control system so that the vehicle control system operates in a manner that minimizes a workload level of a requested service in the geographic location and improves the QoE level experienced by the connected vehicle. The method where the management decision is configured to perform a routing management on the connected vehicle to optimize the QoE level. The method where: the QoE status indicates that a QoE failure of a requested service occurs in the geographic location; and the routing management includes one or more of: selecting a new navigation route for the connected vehicle that detours from the geographic location; modifying an existing navigation route of the connected vehicle to detour from the geographic location; and keeping a current navigation route for the connected vehicle but advising the connected vehicle to operate in a different mode that does not depend on a requested service. The method where the routing management is performed to balance a future workload of a requested service in one or more service areas to avoid a potential future QoE failure that occurs in the one or more service areas. The method where the routing management causes one or more computing resources along a navigation route of the connected vehicle to be utilized in a manner that prevents an outrage of the one or more computing resources or an occurrence of one or more other events that decrease the QoE level. The method where the management decision is configured to select the connected vehicle to provide a requested service so that a potential safety risk in a roadway environment is reduced. The method where the connected vehicle is selected based on one or more priority factors that include one or more of the following: a vehicle duty of the connected vehicle; a dependency of the connected vehicle on the requested service; and a behavior pattern of a driver of the connected vehicle. Implementations of the described techniques may include hardware, a method or process, or computer software on a computer-accessible medium.

One general aspect includes a system including an onboard vehicle computer system of a connected vehicle including a non-transitory memory storing computer code which, when executed by the onboard computer system, causes the onboard computer system to: receive a V2X message that includes a management decision for the connected vehicle, where the management decision is made based at least on a QoE status in a geographic location of the connected vehicle; and modify an operation of a vehicle control system of the connected vehicle to implement the management decision so that a QoE level experienced by the connected vehicle is improved. Other embodiments of this aspect include corresponding computer systems, apparatus, and computer programs recorded on one or more computer storage devices, each configured to perform the actions of the methods.

Implementations may include one or more of the following features. The system where the management decision is made further based at least on one or more of a workload level of a requested service and a traffic condition in the geographic location. The system where the management decision is configured to tune one or more software settings of the vehicle control system so that the vehicle control system operates in a manner that minimizes a workload level of a requested service in the geographic location and improves the QoE level experienced by the connected vehicle. The system where the management decision is configured to perform a routing management on the connected vehicle to optimize the QoE level. The system where: the QoE status indicates that a QoE failure of a requested service occurs in the geographic location; and the routing management includes one or more of: selecting a new navigation route for the connected vehicle that detours from the geographic location; modifying an existing navigation route of the connected vehicle to detour from the geographic location; and keeping a current navigation route for the connected vehicle but advising the connected vehicle to operate in a different mode that does not depend on a requested service. The system where the routing management is performed to balance a future workload of a requested service in one or more service areas to avoid a potential future QoE failure that occurs in the one or more service areas. The system where the management decision is configured to select the connected vehicle to provide a requested service so that a potential safety risk in a roadway environment is reduced. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1A:
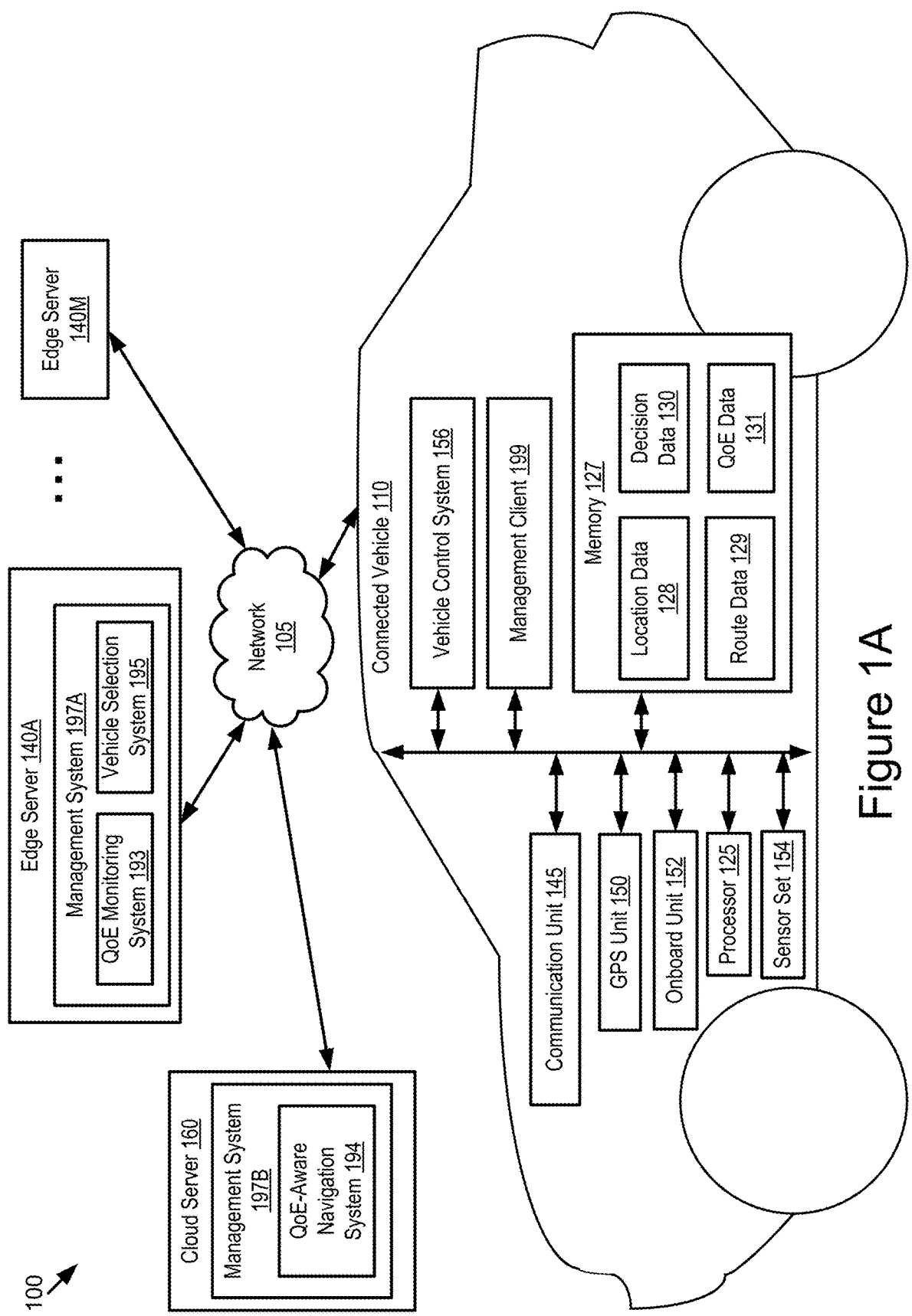
FIG. 1A is a block diagram illustrating an operating environment for a management client and a management system according to some embodiments.

QoE may refer to a proper operation of a vehicle control system of a vehicle. For example, QoE refers to whether the vehicle control system, such as an autonomous driving system and an Advanced Driver Assistance Systems (ADAS system) of the vehicle, operates in a manner that conforms to its system specification and meets a driver's expectation. However, QoE can be lowered when the vehicle control system does not have access to vehicle services in a timely fashion. This is particularly problematic in situations where the vehicle is a connected vehicle that is communicatively coupled to a wireless network and the vehicle services are provided by edge servers or cloud severs via the wireless network.

For example, in a distribution service of an HD map, the HD map needs to be updated and delivered to an on-road vehicle with a sufficiently small latency in order to accurately present a real-time traffic condition to the vehicle. Failure to do so can reduce a value of the HD map and potentially cause the autonomous driving system (and ADAS system) of the vehicle to make incorrect and dangerous decisions due to outdated information.

Accordingly, a problem exists for connected vehicles to ensure that they receive timely and accurate information from edge and cloud servers so that QoE is maintained. This problem may be referred to as QoE management. This problem is particularly important for connected vehicles that utilize vehicle control systems such as ADAS systems and autonomous driving systems.

Existing solutions for providing QoE management for connected vehicles are inadequate. In some scenarios (e.g., in a scenario of an autonomous driving mode), a guarantee of a QoE level of the vehicle control system to be above a certain threshold can be mandatory. However, existing solutions mostly focus on resource management and allocation algorithms for maintaining a certain QoE level for the vehicle control system during its run-time. Because the vehicle usually operates in a complex and often unpredictable roadway environment, these existing solutions may fail or become infeasible in some scenarios. This happens, for example, when cloud servers or edge servers are overloaded by a large number of requests for a vehicle service or compromised by malicious cyber-attacks, which results in a QoE failure of the vehicle service. In these situations, vehicles may take additional actions in real time (or near real time) to prevent consequence caused by the QoE failure.

The embodiments described herein provide QoE management for connected vehicles and overcome the deficiencies of the existing solutions. The embodiments include a management system and a management client that cooperate with one another to provide QoE management for a vehicle control system of a connected vehicle. For example, the management system and the management client cooperate with one another to provide QoE management to the connected vehicle to ensure that the connected vehicle can receive timely and accurate information from edge servers or cloud servers so that the QoE level of the connected vehicle is maintained or improved.

Embodiments of the management system and the management client described herein are applicable in scenarios where a QoE failure is caused by a large volume of service requests that exceed a handing capability of the cloud servers or the edge servers (e.g., the QoE failure is caused by overloading of service requests in the servers).

Embodiments of the management system and the management client described herein provide real-time QoE failure management for the connected vehicle. For example, at least a QoE-aware routing strategy or a vehicle selection strategy can be applied in embodiments described herein. Specifically, responsive to an occurrence of a QoE failure of a requested service in a particular service area, the QoE-aware routing strategy may prevent vehicles from entering the particular service area. The QoE-aware routing strategy may also control a workload amount of the requested service in the particular service area. The vehicle selection strategy may limit a total number of vehicles to provide the requested service so as to reduce a workload level of the requested service. The vehicle selection strategy may also make a risk-aware selection of the vehicles. The QoE-aware routing strategy and the vehicle selection strategy are described below in more detail with reference to FIGS. 2B-2C.

Example benefits of embodiments described herein include, but are not limited to, the following: (1) an alleviation of an impact on road safety caused by a QoE failure; and (2) a faster restoration of a required QoE level if the QoE failure occurs. Other example benefits are also possible.

As described herein, examples of V2X communications include, but are not limited to, one or more of the following: Dedicated Short Range Communication (DSRC) (including Basic Safety Messages (BSMs) and Personal Safety Messages (PSMs), among other types of DSRC communication); Long-Term Evolution (LTE); millimeter wave (mmWave) communication; 3G; 4G; 5G; LTE-V2X; 5G-V2X; LTE-Vehicle-to-Vehicle (LTE-V2V); LTE-Device-to-Device (LTE-D2D); Voice over LTE (VoLTE); etc. In some examples, the V2X communications can include V2V communications, Vehicle-to-Infrastructure (V2I) communications, Vehicle-to-Network (V2N) communications or any combination thereof.

Examples of a wireless message (e.g., a V2X message) described herein include, but are not limited to, the following messages: a DSRC message; a BSM message; a LTE message; a LTE-V2X message (e.g., a LTE-V2V message, a LTE-V2I message, a LTE-V2N message, etc.); a 5G-V2X message; and a millimeter wave message, etc.

Example Overview

Referring to FIG. 1A, depicted is an operating environment 100 for a management client 199 and a management system 197 according to some embodiments. The operating environment 100 may include one or more of the following elements: a connected vehicle 110; a cloud server 160; and one or more edge servers 140 (edge servers 140A, . . . , 140M). These elements of the operating environment 100 may be communicatively coupled to a network 105.

Although one connected vehicle 110, two edge servers 140, one cloud server 160 and one network 105 are depicted in FIG. 1A, in practice the operating environment 100 may include any number of connected vehicles 110, edge servers 140, cloud servers 160 and networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE, 5G-V2X or any other mobile data network or combination of mobile data networks. Further, the network 105 may include one or more IEEE 802.11 wireless networks.

The connected vehicle 110 may be any type of vehicle. For example, the connected vehicle 110 may include one of the following types of vehicles: a car; a truck; a sports utility vehicle; a bus; a semi-truck; a drone; or any other roadway-based conveyance.

In some embodiments, the connected vehicle 110 is a DSRC-enabled vehicle which includes a DSRC radio and a DSRC-compliant GPS unit. The connected vehicle 110 may also include other V2X radios besides a DSRC radio. DSRC is not a requirement of embodiments described herein, and any form of V2X communications is also feasible.

The connected vehicle 110 may include one or more of the following elements: a processor 125; a memory 127; a communication unit 145; a GPS unit 150; an onboard unit 152; a sensor set 154; a vehicle control system 156; and the management client 199. These elements of the connected vehicle 110 may be communicatively coupled to one another via a bus.

In some embodiments, the processor 125 and the memory 127 may be elements of an onboard vehicle computer system (such as computer system 300 described below with reference to FIG. 3). The onboard vehicle computer system may be operable to cause or control the operation of the management client 199. The onboard vehicle computer system may be operable to access and execute the data stored on the memory 127 to provide the functionality described herein for the management client 199 or its elements (see, e.g., FIG. 3).

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The connected vehicle 110 may include one or more processors 125. Other processors, operating systems, sensors, displays, and physical configurations may be possible.

The memory 127 stores instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The connected vehicle 110 may include one or more memories 127.

The memory 127 may store one or more of the following elements: location data 128; route data 129; decision data 130; and QoE data 131.

The location data 128 includes digital data describing a geographic location of the connected vehicle 110. In some embodiments, the geographic location of the connected vehicle 110 can include one or more of: a historical location of the connected vehicle 110; a current location of the connected vehicle 110; or a future location of the connected vehicle 110. For example, the geographic location of the connected vehicle 110 includes one or more of: a destination of the connected vehicle 110; a location along a navigation route of the connected vehicle 110; and a via point that the connected vehicle 110 may travel through, etc.

The route data 129 includes digital data describing a navigation route of the connected vehicle 110. In some embodiments, the route data 129 may also include digital data describing one or more modifications to the navigation route (e.g., a change to the navigation route so that the navigation route detours from a certain area or location).

The decision data 130 includes digital data describing one or more management decisions received from the management system 197. For example, a management decision may include one or more operations to be performed on the connected vehicle 110 so that a QoE level experienced by the connected vehicle 110 is improved. The management decision is described below in more detail.

The QoE data 131 includes digital data describing a QoE level experienced by the connected vehicle 110. In some embodiments, the QoE data 131 also includes digital data describing a QoE status of a geographic location of the connected vehicle 110. For example, the QoE data 131 indicates that the QoE level of the connected vehicle 110 is lowered because a QoE failure occurs on a navigation route of the connected vehicle 110. In another example, the QoE data 131 indicates that the QoE level of the connected vehicle 110 is improved due to an implementation of a management decision on the connected vehicle 110.

The communication unit 145 transmits and receives data to and from the network 105 or to another communication channel. In some embodiments, the communication unit 145 may include a DSRC transceiver, a DSRC receiver and other hardware or software necessary to make the connected vehicle 110 a DSRC-enabled device. For example, the communication unit 145 includes a DSRC antenna configured to broadcast DSRC messages via the network. The DSRC antenna may also transmit BSM messages at a fixed or variable interval (e.g., every 0.1 seconds, at a time interval corresponding to a frequency range from 1.6 Hz to 10 Hz, etc.) that is user configurable.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the GPS unit 150 is a conventional GPS unit of the connected vehicle 110. For example, the GPS unit 150 may include hardware that wirelessly communicates with a GPS satellite to retrieve data that describes a geographic location of the connected vehicle 110. In some embodiments, the GPS unit 150 is a DSRC-compliant GPS unit of the connected vehicle 110. The DSRC-compliant GPS unit is operable to provide GPS data describing the geographic location of the connected vehicle 110 with lane-level accuracy.

The onboard unit 152 can include one or more processors and one or more memories. For example, the onboard unit 152 includes an electronic control unit (ECU). In some embodiments, the management client 199 of the connected vehicle 110 is installed on the onboard unit 152.

The sensor set 154 includes one or more sensors that are operable to measure a roadway environment outside of the connected vehicle 110. For example, the sensor set 154 may include one or more sensors that record one or more physical characteristics of the roadway environment that is proximate to the connected vehicle 110. The memory 127 may store sensor data that describes the one or more physical characteristics recorded by the sensor set 154.

In some embodiments, the sensor set 154 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The vehicle control system 156 may include an ADAS system or an autonomous driving system. The ADAS system or the autonomous driving system may provide some or all of the autonomous functionality for the connected vehicle 110. In some embodiments, the vehicle control system 156 may need to access one or more vehicle services in order to provide the autonomous functionality.

The edge server 140 includes a processor-based computing device which is installed in a roadside unit ("RSU") or some other processor-based infrastructure component of a roadway. In the operating environment 100 illustrated in FIG. 1A, the roadway includes multiple edge servers 140A, . . . , 140M. The edge server 140A includes an instance of the management system (e.g., a management system 197A). The edge server 140M may have a structure similar to that of the edge server 140A, and similar description is not repeated here.

The cloud sever 160 includes a processor-based computing device. The edge servers 140 may communicate with the cloud server 160 via the network 105. The cloud server 160 includes an instance of the management system (e.g., a management system 197B).

The management systems 197A and 197B are different instances of the management system and may be referred to herein as "management system 197" individually or collectively.

In some embodiments, the management system 197 includes code and routines that are operable, when executed by a processor of the edge server 140 or the cloud server 160, to cause the processor to provide QoE management for vehicle control systems. For example, the management system 197 is operable to provide real-time (or near real-time) QoE failure management for vehicle control systems.

In some embodiments, the management system 197 may be implemented using hardware including a field-programmable gate array ("FPGA") or an application-specific integrated circuit ("ASIC"). In some other embodiments, the management system 197 may be implemented using a combination of hardware and software. The management system 197 may be stored in a combination of the devices (e.g., servers or other devices), or in one of the devices. For example, any combination of the cloud server 160 and the edge server 140 may include instances of the management system 197 so that the functionality of the management system 197 is implemented in a distributed fashion among two or more endpoints connected to the network 105.

In some embodiments, the management system 197 includes one or more of the following sub-systems: (1) a QoE monitoring system 193; (2) a QoE-aware navigation system 194; and (3) a vehicle selection system 195. These components of the management system 197 can be installed in the edge server 140 or the cloud server 160 as shown in FIG. 1A. In some embodiments, the management system 197 makes management decisions and wirelessly communicates with the management client 199 of the connected vehicle 110 to implement these management decisions.

The QoE monitoring system 193 can be co-located with the edge server 140 that provides a requested service to the connected vehicle 110. A requested service can be a vehicle service that is requested by the connected vehicle 110. Examples of a requested service include, but are not limited to, the following: a HD map creation and distribution service; a cruise assistance service; and a platooning service, etc. In some embodiments, the QoE monitoring system 193 is responsible for monitoring a QoE status of a service area managed by the edge server 140 and a workload level for the requested service in the service area. The QoE status and the workload level are transmitted to the QoE-aware navigation system 194 and the vehicle selection system 195.

The QoE monitoring system 193 is described below in more detail with reference to FIG. 2A.

In some embodiments, the QoE-aware navigation system 194 makes a management decision (e.g., a routing selection) for the connected vehicle 110 based on a traffic condition and the QoE status reported from the QoE monitoring system 193. For example, assume that a QoE failure of a requested service is detected in a service area (e.g., the QoE failure results in a failure to provide the requested service to vehicles in the service area). Then, the QoE-aware navigation system 194 either prevents other vehicles from taking a route to the service area or advices the other vehicles to operate in an alternative mode that does not depend on the requested service.

In some embodiments, the QoE-aware navigation system 194 also predicts a future amount of traffic that flows to different service areas and whether a resulting future workload may cause potential QoE failures. If the resulting future workload may cause potential QoE failures, the QoE-aware navigation system 194 makes a management decision (e.g., a traffic adjustment) by re-routing at least some of the traffic to other service areas.

The QoE-aware navigation system 194 is described below in more detail with reference to FIG. 2B.

In some embodiments, the vehicle selection system 195 is activated during an occurrence of a QoE failure. The vehicle selection system 195 may make a management decision that chooses a subset of the vehicles in its service area to deliver the requested service so that a total amount of requests to be processed in the service area is reduced. In this way, a required QoE level for each selected vehicle can be restored. This management decision is made such that vehicles that highly depend on the requested service (i.e., autonomous vehicles) are provided with the requested service first so as to minimize an overall impact on the road safety.

The vehicle selection system 195 is described below in more detail with reference to FIG. 2C.

In some embodiments, the management client 199 includes software that is operable, when executed by the processor 125, to cause the processor 125 to execute one or more steps of methods 400 and 500 described below with reference to FIGS. 4-5 and one or more operations described below with reference to FIGS. 6A-7B.

In some embodiments, the management client 199 may be implemented using hardware including an FPGA or an ASIC. In some other embodiments, the management client 199 may be implemented using a combination of hardware and software. The management client 199 may be stored in a combination of the devices (e.g., servers or other devices), or in one of the devices.

In some embodiments, the management client 199 may be installed on the onboard unit 152 of the connected vehicle 110. The management client 199 includes code and routines that are operable, when executed by the processor 125 of the connected vehicle 110, to cause the processor 125 to: receive a V2X message that includes one or more management decisions from the management system 197; and control an operation of the vehicle control system 156 based on the one or more management decisions.

For example, the management client 199 receives digital data describing a management decision from the management system 197. Using this digital data, the management client 199 provides the following example functionality (any one of which is optional): informing a driver with real-time and fresh information showing how a navigation route of the connected vehicle 110 may affect a QoE level of the connected vehicle 110; modifying the navigation route of the connected vehicle 110 to optimize the QoE level; and tuning one or more software settings for the vehicle control system 156 of the connected vehicle 110 so that the vehicle control system 156 operates in a manner that minimizes a workload of the requested service and improves the QoE level as much as possible given a current driving scenario.

The management client 199 is described below in more detail with reference to FIGS. 3-7B.

Figure 1B:
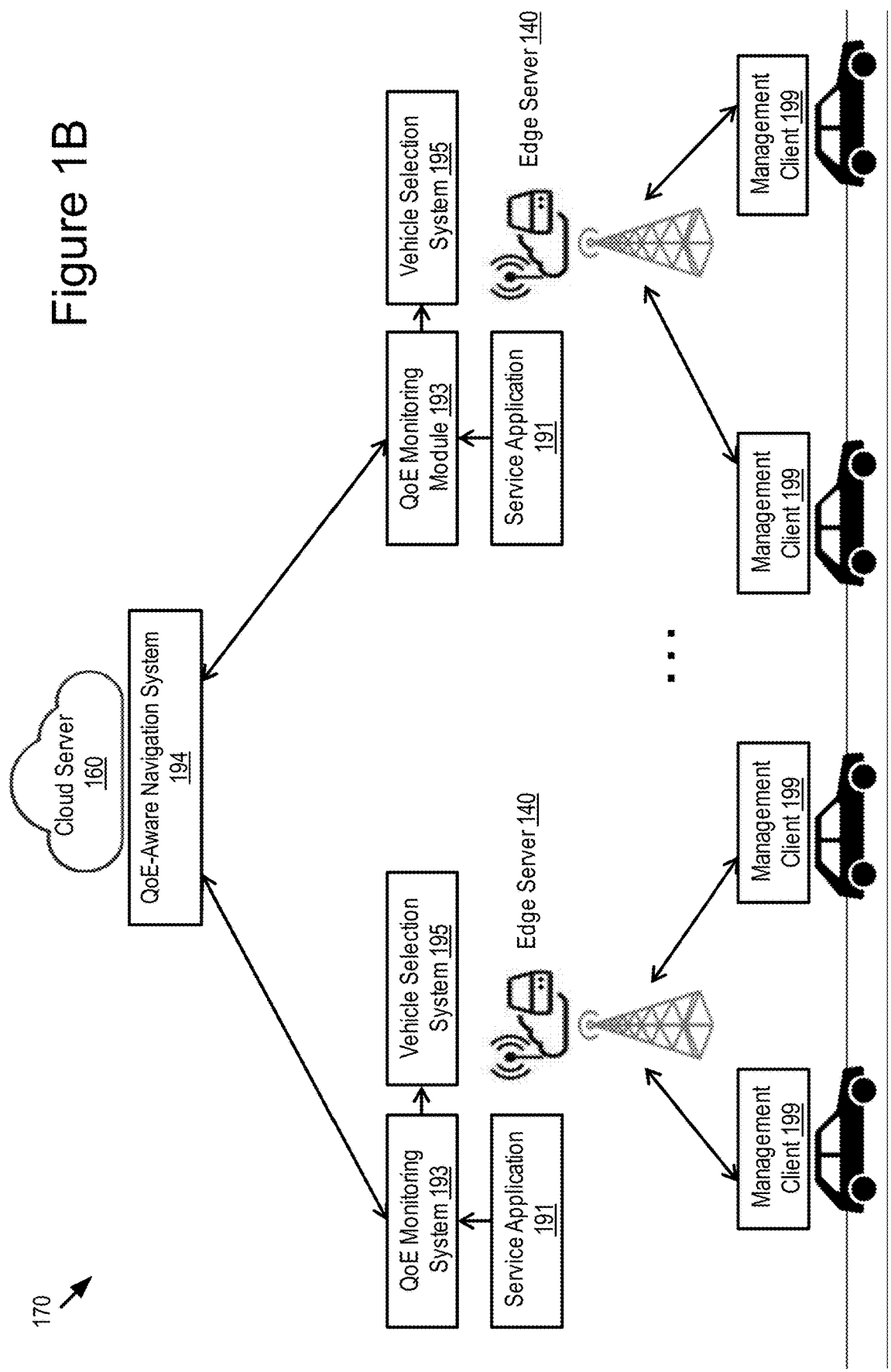
FIG. 1B is a block diagram illustrating an example architecture for the management client and the management system according to some embodiments.

Referring to FIG. 1B, illustrated is an example architecture 170 for the management client 199 and the management system 197 according to some embodiments. The QoE monitoring system 193 and the vehicle selection system 195 of the management system 197 are co-located with a service application 191 at each local edge server 140. The service application 191 is configured to provide a requested service to vehicles in a service area managed by the edge server 140.

The QoE-aware navigation system 194 of the management system 197 is deployed in the cloud server 160. The QoE-aware navigation system 194 communicates with various QoE monitoring systems 193 from different edge servers 140 for maintaining up-to-date QoE status information in different service areas.

As depicted in FIG. 1B, each connected vehicle 110 is installed with the management client 199. The management client 199 communicates with one or more of the QoE monitoring system 193, the QoE-aware navigation system 194 and the vehicle selection system 195 to receive one or more management decisions.

Management System

Figure 2A:
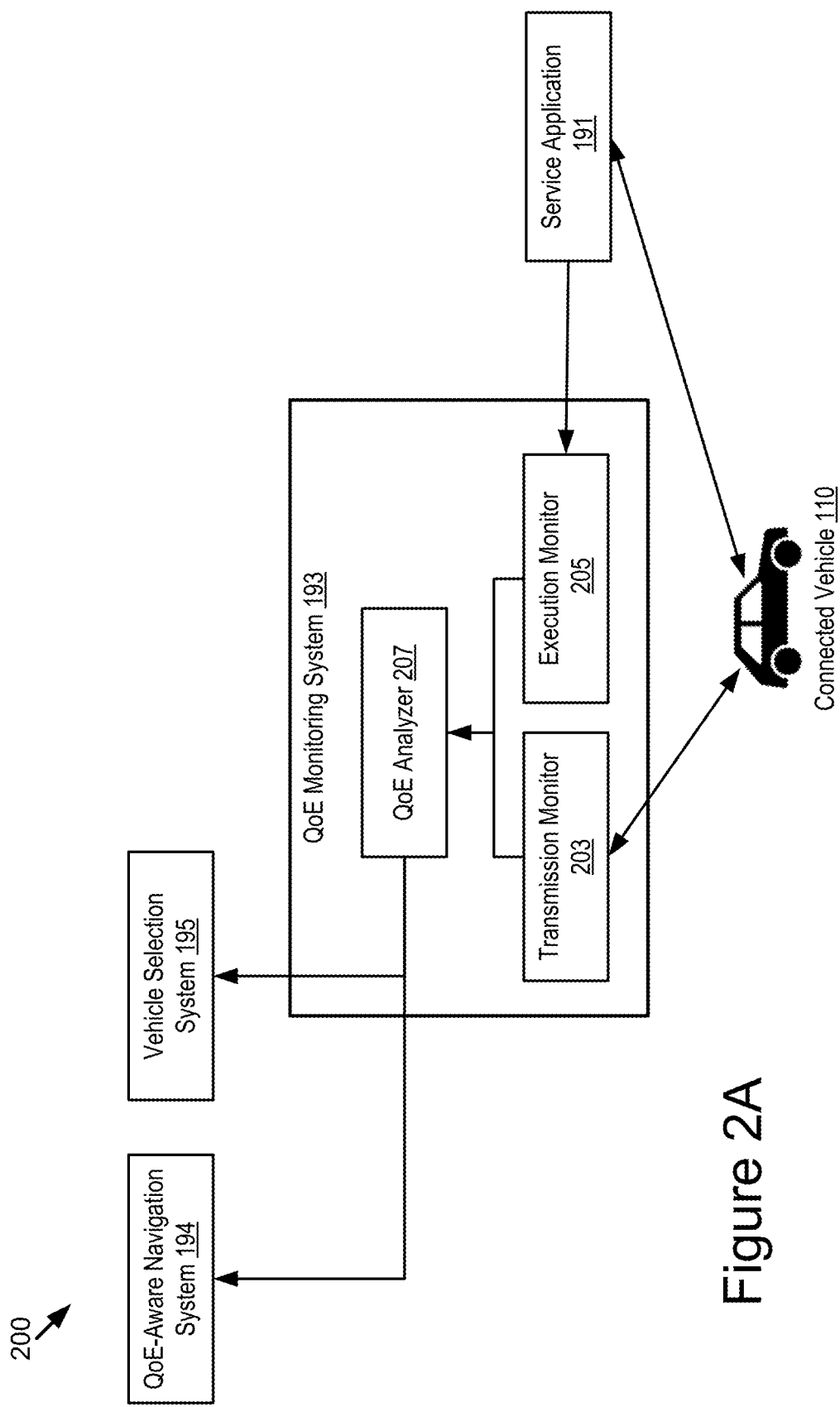
FIG. 2A is a block diagram illustrating a QoE monitoring system of the management system according to some embodiments.

Referring to FIG. 2A, a block diagram 200 of the QoE monitoring system 193 of the management system 197 is illustrated according to some embodiments. In some embodiments, the QoE monitoring system 193 is installed on the edge server 140 that is located in a particular service area. The QoE monitoring system 193 is configured to monitor a QoE status and a workload level of a requested service in the service area. For example, the QoE status of the requested service may include one of the following: a desirable QoE status indicating that all requests for the requested service are fulfilled in the service area; an acceptable QoE status indicating that a percentage of requests for the requested service that are fulfilled is not less than a threshold (e.g., 10%, 20%, or 30%, etc.); and a QoE failure status indicating that a percentage of requests for the requested service that are fulfilled is less than the threshold (e.g., a failure to fulfill 90% of the requests for the requested service). Other examples of the QoE status is also possible.

In some embodiments, the QoE monitoring system 193 includes one or more of the following elements: a transmission monitor 203; an execution monitor 205; and a QoE analyzer 207.

In some embodiments, the service application 191 is also installed in the edge server 140 to provide the requested service to vehicles located in the service area. The service application 191 may serve each vehicle (e.g., each connected vehicle 110) with the requested service in two stages. In a first stage, the service application 191 collects input data from one or more of the vehicle, the edge server 140 and the cloud server 160. The service application 191 executes one or more operations for the requested service based on the input data to generate a processing result. In a second stage, the service application 191 delivers the processing result to the vehicle through a network transmission. The execution monitor 205 and the transmission monitor 203 are configured to monitor the first stage and the second stage respectively.

In some embodiments, the execution monitor 205 measures an execution time of the service application 191 that executes one or more operations of the requested service for each vehicle. The execution monitor 205 may also determine whether any execution error occurs. Then, the execution monitor 205 sends data describing the execution time (as well as the execution error if there is any) to the QoE analyzer 207.

In some embodiments, the transmission monitor 203 determines a network transmission status of the requested service at least by collecting and analyzing an acknowledgement message received from each vehicle. Specifically, when a particular vehicle successfully receives a requested service, this particular vehicle returns an acknowledgement message including a time of receipt of the processing result. Based on the acknowledge message, the transmission monitor 203 determines a network transmission status of the requested service. For example, the transmission monitor 203 determines whether the network transmission of the processing result to the connected vehicle 110 works normally with an expected delay based on the acknowledge message. Then, the transmission monitor 203 sends data describing the network transmission status of the requested service to the QoE analyzer 207.

In some embodiments, the QoE analyzer 207 determines a QoE status and a workload level of the requested service in its service area based on the execution time and the network transmission status. For example, the QoE analyzer 207 determines whether a QoE failure has occurred. The QoE analyzer 207 also determines a workload level that the requested service currently experiences. The QoE analyzer 207 delivers the QoE status and the workload level of the requested service to one or more of the QoE-aware navigation system 194 and the vehicle selection system 195.

Figure 2B:
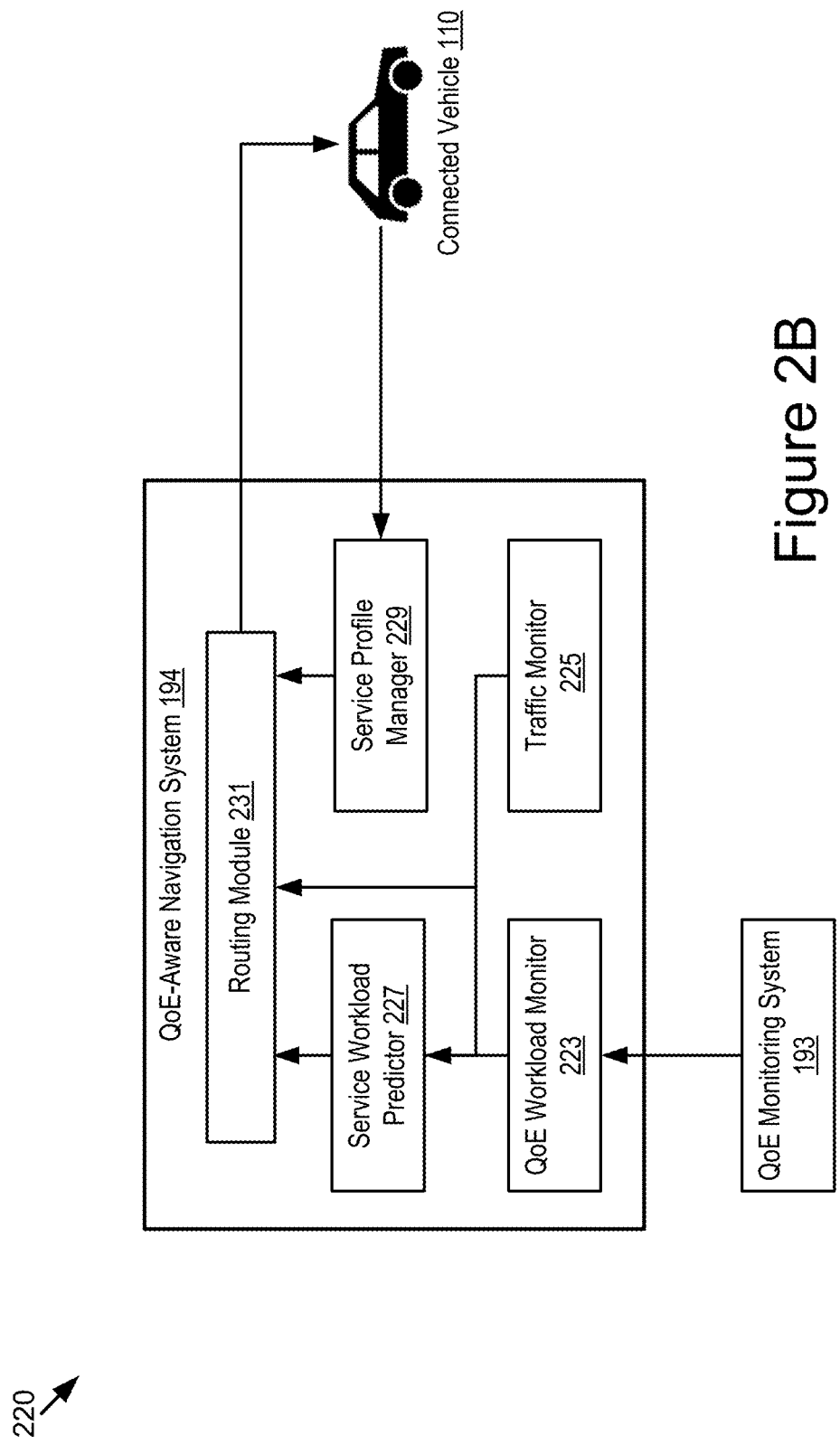
FIG. 2B is a block diagram illustrating a QoE-aware navigation system of the management system according to some embodiments.

With reference to FIG. 2B, depicted is a block diagram 220 of the QoE-aware navigation system 194 of the management system 197 according to some embodiments. The QoE-aware navigation system 194 is configured to make a management decision (e.g., a route selection) for the connected vehicle 110 based on one or more of: a traffic condition in a geographic location of the connected vehicle 110; a QoE status of the requested service in the geographic location; and a workload level of the requested service in the geographic location.

In some embodiments, the QoE-aware navigation system 194 includes one or more of the following elements: a QoE workload monitor 223; a traffic monitor 225; a service workload predictor 227; a service profile manager 229; and a routing module 231.

In some embodiments, the traffic monitor 225 maintains a real-time (or near real-time) traffic map that provides traffic information on one or more of candidate routes, travel distances, traffic conditions and road conditions, etc., in different service areas. The traffic monitor 225 sends data describing the traffic information in different service areas to one or more of the service workload predictor 227 and the routing module 231.

The QoE workload monitor 223 is configured to collect QoE statuses and workload levels of the requested service from various QoE monitoring systems 193 distributed in different service areas. The QoE workload monitor 223 sends data describing the QoE statuses and the workload levels of the requested service in the different service areas to one or more of the service workload predictor 227 and the routing module 231.

The service workload predictor 227 predicts an expected amount of workload in a future time window for the requested service in each of the different service areas based on one or more of the traffic condition, the QoE status and the workload level of the requested service in each of the different service areas. The service workload predictor 227 makes a QoE-failure prediction for each of the different service areas based on the expected amount of workload in each of the different service areas. For example, the service workload predictor 227 determines whether there can be a potential QoE failure in a particular service area based on the expected amount of workload in that service area. The service workload predictor 227 sends data describing the QoE-failure prediction for each of the different service areas to the routing module 231.

The service profile manager 229 is configured to manage a profile of the requested service accessed by the connected vehicle 110. For example, a profile of the requested service includes one or more of the following elements: an identifier of the connected vehicle 110; a time when the requested service is requested; a location where the requested service is requested; and a total number of times that the requested service is requested within a certain time window, etc. The profile of the requested service may also include other information. The service profile manager 229 may output the profile of the requested service to the routing module 231.

In some embodiments, the routing module 231 aggregates data received from the QoE workload monitor 223, the traffic monitor 225, the service workload predictor 227 and the service profile manager 229, respectively. The routing module 231 is configured to make a management decision for the connected vehicle 110 based on the aggregated data. For example, the aggregated data includes one or more of the following: (1) the traffic condition in the geographic location of the connected vehicle 110; (2) the QoE status of the requested service in the geographic location; (3) the workload level of the requested service in the geographic location; (4) the QoE statuses and the workload levels of the requested service in different service areas; (5) the QoE-failure prediction for each of the different service areas; and (6) the profile of the requested service accessed by the connected vehicle 110.

In some embodiments, the management decision is configured to tune one or more software settings for the vehicle control system 156 of the connected vehicle 110. For example, by tuning the one or more software settings of the vehicle control system 156, the vehicle control system 156 may become less dependent on the requested service and may rely more on a manual operation of a driver of the connected vehicle 110. In this way, the vehicle control system 156 can operate in a manner that minimizes the workload level for the requested service in the geographic location and improves the QoE level experienced by the connected vehicle 110.

In some embodiments, the management decision is configured to perform a routing management on the connected vehicle 110 to optimize the QoE level. For example, the QoE status indicates that a QoE failure of the requested service occurs in the geographic location of the connected vehicle 110. The routing management includes one or more of: selecting a new navigation route for the connected vehicle 110 that detours from the geographic location (e.g., assigning a different navigation route with the requested service to the connected vehicle 110); modifying an existing navigation route of the connected vehicle 110 to detour from the geographic location; and keeping a current navigation route for the connected vehicle 110 but advising the connected vehicle 110 to operate in a different mode that does not depend on the requested service (e.g., advising the connected vehicle 110 to change from an autonomous driving mode to a manual driving mode).

In some embodiments, the routing management is performed to balance a future workload of the requested service in different service areas to avoid potential future QoE failures that may occur in the different service areas. For example, a route selection for the connected vehicle 110 may be configured to balance a future workload of the requested service in different service areas to avoid potential QoE failures (i.e., avoiding to route all the vehicles to travel along a single route).

In some embodiments, the routing management causes one or more computing resources along a navigation route of the connected vehicle 110 to be utilized in a manner that prevents an outrage of the one or more computing resources or an occurrence of one or more other events that decrease the QoE level. For example, by advising the connected vehicle 110 to operate in a different mode that does not depend on the requested service, the connected vehicle 110 may consume less computing resources along the navigation route. In this way, an outrage of the computing resources can be avoided.

Figure 2C:
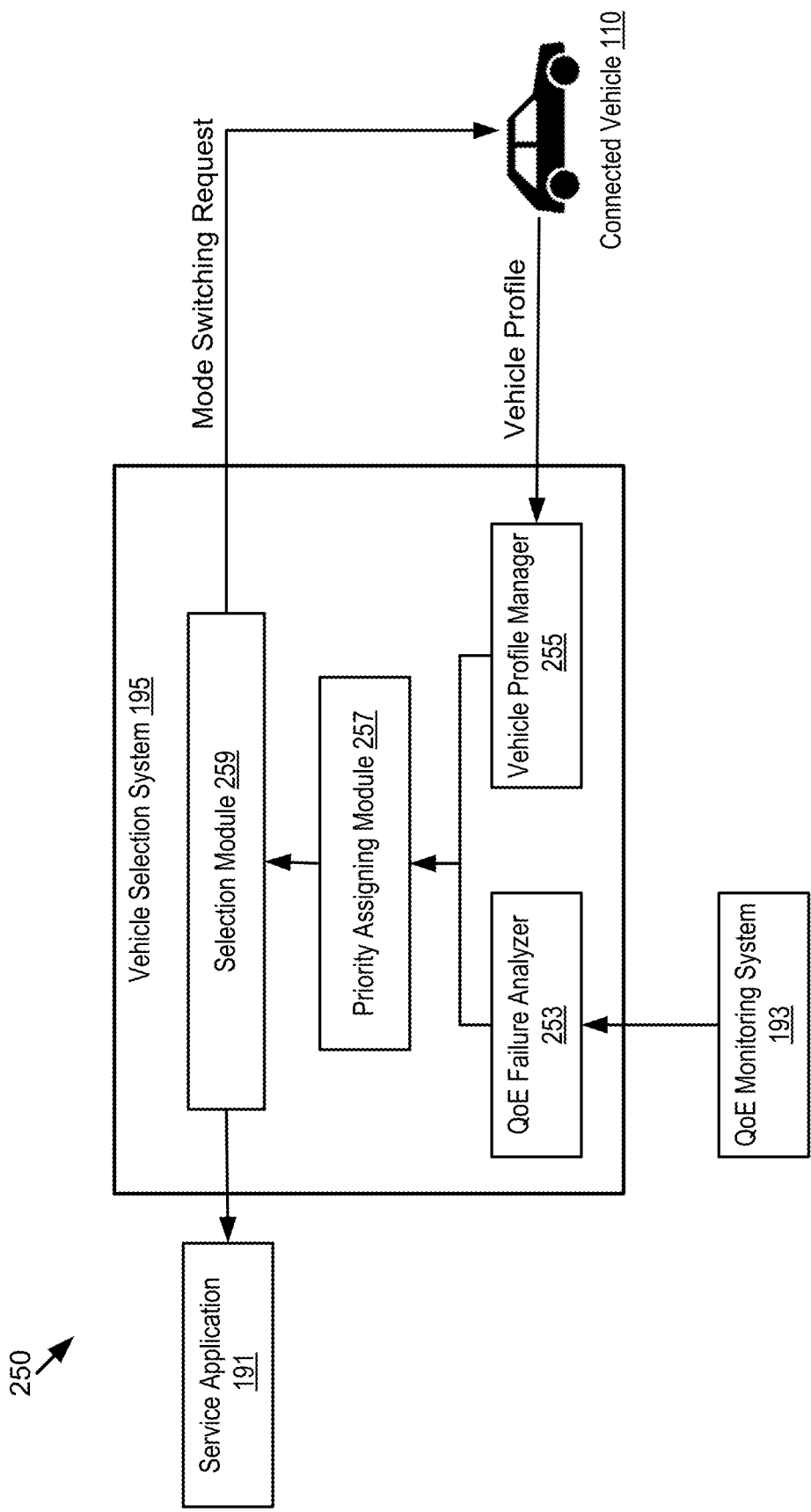
FIG. 2C is a block diagram illustrating a vehicle selection system of the management system according to some embodiments.

With reference to FIG. 2C, a block diagram 250 illustrating the vehicle selection system 195 of the management system 197 is illustrated according to some embodiments. For example, the vehicle selection system 195 is installed on the edge server 140 as depicted in FIG. 1B. The vehicle selection system 195 may be activated during a QoE failure that occurs in a service area of the edge server 140 to limit a total number of vehicles for the requested service. In this way, a required QoE level for a vehicle that has access to the requested service can be restored. However, a refusal of the requested service to a vehicle may increase a likelihood of an unsafe operation of the vehicle. Thus, the limited number of vehicles to provide the requested service needs to be selected to minimize an overall safety risk in the roadway environment.

In some embodiments, the vehicle selection system 195 is configured to make a management decision responsive to an occurrence of the QoE failure in the service area of the edge server 140. The management decision is configured to select one or more vehicles to provide the requested service so that a potential safety risk in a roadway environment is reduced. For example, the vehicle selection system 195 selects the one or more vehicles based on one or more priority factors, which are described below in more detail.

In some embodiments, the vehicle selection system 195 includes one or more of the following elements: a QoE failure analyzer 253; a vehicle profile manager 255; a priority assigning module 257; and a selection module 259.

The QoE failure analyzer 253 communicates with the QoE monitoring system 193 and activates the vehicle selection system 195 responsive to receiving data describing a QoE failure in the service area from the QoE monitoring system 193. The QoE failure analyzer 253 also determines an achievable capacity of the requested service given a current operating environment of the requested service.

The vehicle profile manager 255 may be configured to maintain a profile of each vehicle in the service area managed by the edge server 140. The profile may include information related to the vehicle such as a vehicle type, a driver's behavior record, a degree of dependence of the vehicle on the requested service, etc.

The priority assigning module 257 performs a risk estimation for each vehicle and assigns a priority for the requested service to each vehicle based at least on the achievable capacity of the requested service and a profile of the corresponding vehicle. For example, if the achievable capacity of the requested service is below a certain threshold, then the priority assigning module 257 may decrease a priority for a vehicle that has less dependence on the requested service.

In some embodiments, the priority assigning module 257 associates each vehicle in the service area with a priority for the requested service based on an expected risk that the corresponding vehicle may impose on a road safety without the requested service. For example, the priority assigning module 257 determines the priority for the corresponding vehicle based on one or more of the following priority factors: a vehicle duty; a dependency on the requested service; and a behavior pattern of a driver, etc.

With respect to a vehicle duty, the priority assigning module 257 may assign a higher priority to a heavy duty vehicle or a special duty vehicle (e.g., a police care, a fire truck, an ambulance, etc.) because this type of vehicles usually have a higher impact on the road traffic than ordinary vehicles.

With respect to a dependency on the requested service, some vehicles may have a higher dependency on the requested service than others. For example, an unmanned autonomous vehicle may heavily depend on vehicle services (such as a location service, an HD map distribution service and a V2Cloud cruise assistance service) in order to operate safely. Absence of these services may significantly increase a likelihood of incorrect decisions made by the unmanned autonomous vehicle. On the other hand, vehicles with human drivers onboard, whether they are autonomous or not, have less dependence on these services as they can fall back to a manual driving mode. Thus, compared with a vehicle that has a low dependence on the requested service, the priority assigning module 257 may assign a higher priority to a vehicle that has a high dependence on the requested service.

With respect to a behavior pattern of a driver, a driver with safe driving behaviors and records (referred to "safe driver") may be given a higher confidence of safe driving without the requested service than a driver with unsafe driving behaviors and records (referred to "unsafe driver"). In this case, the priority assigning module 257 may assign a lower priority to the safe driver for certain services when compared to the unsafe driver. For example, with respect to a V2Cloud cruise control service and a platooning service, the priority assigning module 257 may assign a high priority to aggressive and dangerous drivers such that their driving behaviors are controlled and regulated.

The selection module 259 is configured to select which vehicle to provide the requested service based on priority data received from the priority assigning module 257. For example, the selection module 259 selects a certain number of vehicles that have highest priorities to provide the requested service. The selection module 259 notifies the service application 191 of the selected vehicles so that the service application 191 can provide the requested service to these vehicles. In addition, the selection module 259 informs vehicles that are not selected for the requested service and advises these vehicles to switch to alternative operating modes that do not rely on the requested service. For example, the selection module 259 sends a mode switching request to a connected vehicle 110 that is not selected for providing the requested service so that the connected vehicle 110 may switch to a manual driving mode.

Example Computer System

Figure 3:
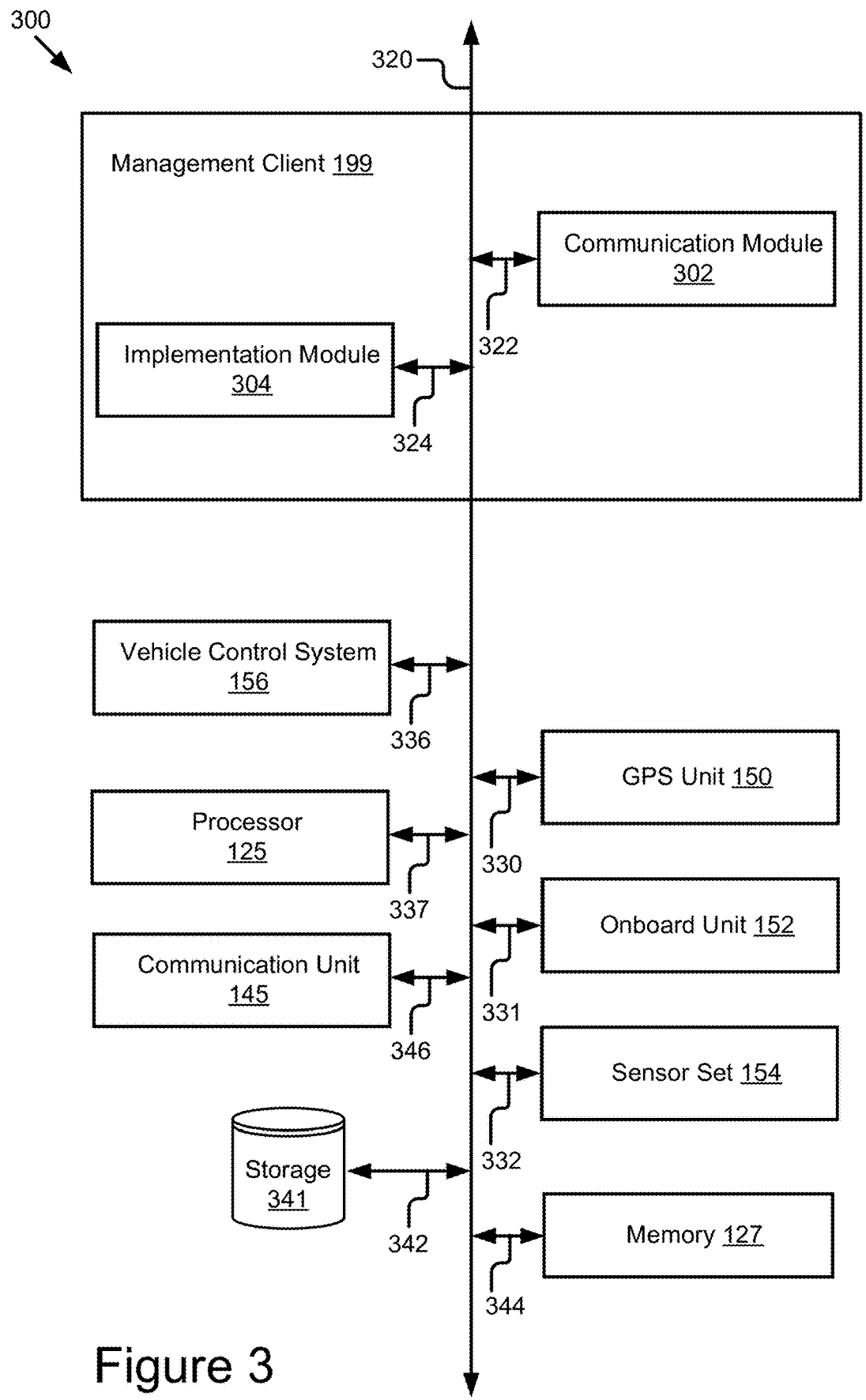
FIG. 3 is a block diagram illustrating an example computer system including the management client according to some embodiments.

Referring now to FIG. 3, depicted is a block diagram illustrating an example computer system 300 including the management client 199 according to some embodiments. In some embodiments, the computer system 300 may include a special-purpose computer system that is programmed to perform one or more steps of methods 400 and 500 described below with reference to FIGS. 4-5.

In some embodiments, the computer system 300 may be an element of the connected vehicle 110. In some embodiments, the computer system 300 may be an onboard vehicle computer of the connected vehicle 110. In some embodiments, the computer system 300 may include an engine control unit, head unit or some other processor-based computing device of the connected vehicle 110.

The computer system 300 may include one or more of the following elements according to some examples: the management client 199; the processor 125; the communication unit 145; the sensor set 154; the GPS unit 150; the memory 127; the onboard unit 152; the vehicle control system 156; and a storage 341. The components of the computer system 300 are communicatively coupled by a bus 320.

In the illustrated embodiment, the processor 125 is communicatively coupled to the bus 320 via a signal line 337. The communication unit 145 is communicatively coupled to the bus 320 via a signal line 346. The sensor set 154 is communicatively coupled to the bus 320 via a signal line 332. The GPS unit 150 is communicatively coupled to the bus 320 via a signal line 330. The storage 341 is communicatively coupled to the bus 320 via a signal line 342. The memory 127 is communicatively coupled to the bus 320 via a signal line 344. The onboard unit 152 is communicatively coupled to the bus 320 via a signal line 331. The vehicle control system 156 is communicatively coupled to the bus 320 via a signal line 336.

The following elements of the computer system 300 are described above with reference to FIG. 1A, and so, those descriptions will not be repeated here: the processor 125; the communication unit 145; the sensor set 154; the GPS unit 150; the onboard unit 152; the vehicle control system 156; and the memory 127.

The storage 341 can be a non-transitory storage medium that stores data for providing the functionality described herein. The storage 341 may be a dynamic random-access memory (DRAM) device, a static random-access memory (SRAM) device, flash memory, or some other memory devices. In some embodiments, the storage 341 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 3, the management client 199 includes: a communication module 302; and an implementation module 304. These components of the management client 199 are communicatively coupled to each other via the bus 320. In some embodiments, components of the management client 199 can be stored in a single server or device. In some other embodiments, components of the management client 199 can be distributed and stored across multiple servers or devices.

The communication module 302 can be software including routines for handling communications between the management client 199 and other components of the computer system 300. In some embodiments, the communication module 302 can be stored in the memory 127 of the computer system 300 and can be accessible and executable by the processor 125. The communication module 302 may be adapted for cooperation and communication with the processor 125 and other components of the computer system 300 via a signal line 322.

The communication module 302 sends and receives data, via the communication unit 145, to and from one or more elements of the operating environment 100. For example, the communication module 302 receives or transmits, via the communication unit 145, a V2X message. The communication module 302 may send or receive any of the data or messages described above with reference to FIGS. 1A and 1B via the communication unit 145.

In some embodiments, the communication module 302 receives data from the implementation module 304 of the management client 199 and stores the data in one or more of the storage 341 and the memory 127. The implementation module 304 may cause the communication module 302 to communicate with the other elements of the computer system 300 or the operating environment 100 (via the communication unit 145). For example, the implementation module 304 may use the communication module 302 to communicate with the sensor set 154 and cause the sensor set 154 to record sensor data.

The implementation module 304 can be software including routines for implementing a management decision for the connected vehicle 110. In some embodiments, the implementation module 304 can be stored in the memory 127 of the computer system 300 and can be accessible and executable by the processor 125. The implementation module 304 may be adapted for cooperation and communication with the processor 125 and other components of the computer system 300 via a signal line 324.

In some embodiments, the implementation module 304 receives, via the communication unit 145, a V2X message that includes a management decision for the connected vehicle 110 from the QoE-aware navigation system 194 or the vehicle selection system 195. The management decision can be made based at least on one or more of: a QoE status in a geographic location of the connected vehicle 110; a workload level for a requested service in the geographic location; and a traffic condition in the geographic location. The implementation module 304 is configured to modify an operation of the vehicle control system 156 of the connected vehicle 110 to implement the management decision so that a QoE level experienced by the connected vehicle 110 is improved.

For example, the management decision is made based at least on a detection of a QoE failure of a requested service and a workload level for the requested service in the geographic location of the connected vehicle. The implementation module 304 is operable to modify an operation of the vehicle control system 156 to implement the management decision so that the vehicle control system 156 operates in a manner that minimizes the workload level for the requested service in the geographic location and improves a QoE level experienced by the connected vehicle 110.

In some embodiments, the management decision is configured to tune one or more software settings of the vehicle control system 156. In this way, the vehicle control system 156 operates in a manner that minimizes the workload level for the requested service in the geographic location and improves the QoE level experienced by the connected vehicle 110.

In some embodiments, the management decision is configured to perform a routing management on the connected vehicle 110 to optimize the QoE level. For example, the QoE status indicates that a QoE failure of the requested service occurs in the geographic location. The routing management includes one or more of: selecting a new navigation route for the connected vehicle 110 that detours from the geographic location; modifying an existing navigation route of the connected vehicle 110 to detour from the geographic location; and keeping a current navigation route for the connected vehicle 110 but advising the connected vehicle 110 to operate in a different mode that does not depend on the requested service.

In some embodiments, the routing management causes one or more computing resources along a navigation route of the connected vehicle 110 to be utilized in a manner that prevents an outrage of the one or more computing resources or an occurrence of one or more other events that decrease the QoE level.

In some embodiments, the routing management is performed to balance a future workload of the requested service in one or more service areas to avoid a potential future QoE failure that occurs in the one or more service areas.

In some embodiments, the management decision is configured to select the connected vehicle 110 to provide the requested service so that a potential safety risk in a roadway environment is reduced. For example, the connected vehicle 110 is selected based on one or more priority factors that include one or more of the following: a vehicle duty of the connected vehicle 110; a dependency of the connected vehicle 110 on the requested service; and a behavior pattern of a driver of the connected vehicle 110.

In some other embodiments, the management decision indicates that the connected vehicle 110 is not selected to provide the requested service. The management decision is operable to modify an operation of the vehicle control system 156 so that a driving mode of the connected vehicle 110 is changed to a manual driving mode that does not rely on the requested service.

It is noted that the geographic location of the connected vehicle 110 can include one or more of: a historical location of the connected vehicle 110; a current location of the connected vehicle 110; or a future location of the connected vehicle 110. For example, the geographic location of the connected vehicle 110 includes one or more of: a destination of the connected vehicle 110; a location along a navigation route of the connected vehicle 110; and a via point that the connected vehicle 110 may travel to, etc.

Example Processes

Figure 4:
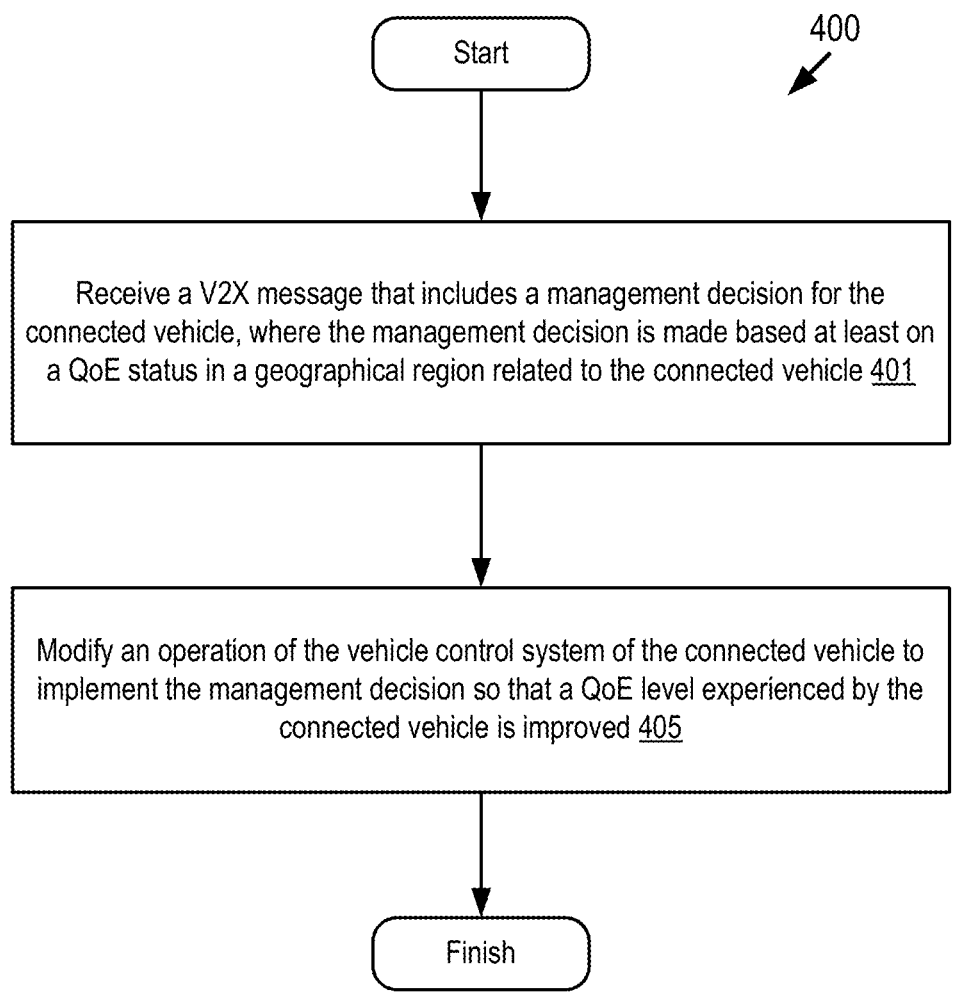
FIG. 4 depicts a method for managing a QoE level experienced by a connected vehicle according to some embodiments.

Referring now to FIG. 4, depicted is a flowchart of an example method 400 for managing a QoE level experienced by the connected vehicle 110 according to some embodiments. The steps of the method 400 are executable in any order, and not necessarily the order depicted in FIG. 4.

At step 401, the implementation module 304 receives, via the communication unit 145, a V2X message that includes a management decision for the connected vehicle 110. For example, the management decision is made based at least on a QoE status in a geographic location of the connected vehicle 110.

At step 405, the implementation module 304 modifies an operation of the vehicle control system 156 of the connected vehicle 110 to implement the management decision so that a QoE level experienced by the connected vehicle 110 is improved.

Figure 5:
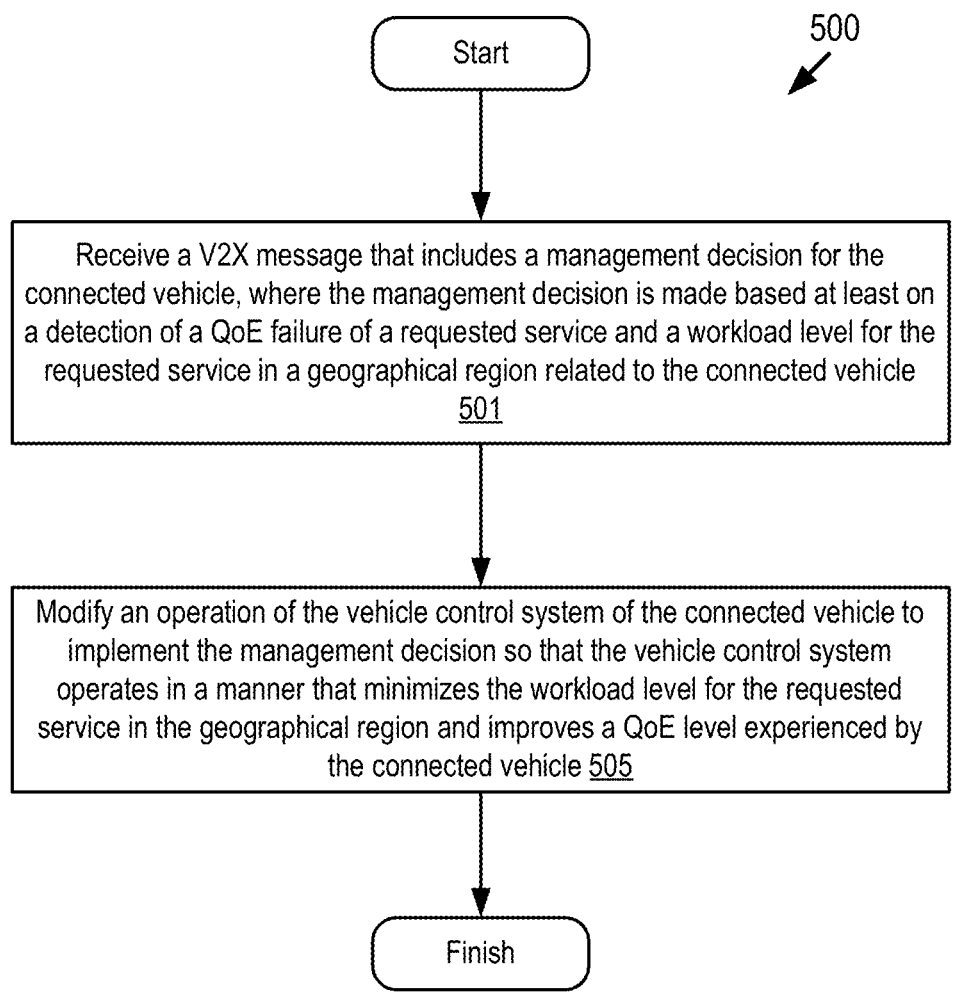
FIG. 5 depicts another method for managing a QoE level experienced by a connected vehicle according to some embodiments.

FIG. 5 depicts another method 500 for managing a QoE level experienced by the connected vehicle 110 according to some embodiments. The steps of the method 500 are executable in any order, and not necessarily the order depicted in FIG. 5.

At step 501, the implementation module 304 receives a V2X message that includes a management decision for the connected vehicle 110. For example, the management decision is made based at least on a detection of a QoE failure of a requested service and a workload level for the requested service in a geographic location of the connected vehicle 110.

At step 505, the implementation module 304 modifies an operation of the vehicle control system 156 of the connected vehicle 110 to implement the management decision so that the vehicle control system 156 operates in a manner that minimizes the workload level for the requested service in the geographic location and improves a QoE level experienced by the connected vehicle.

Figure 6A:
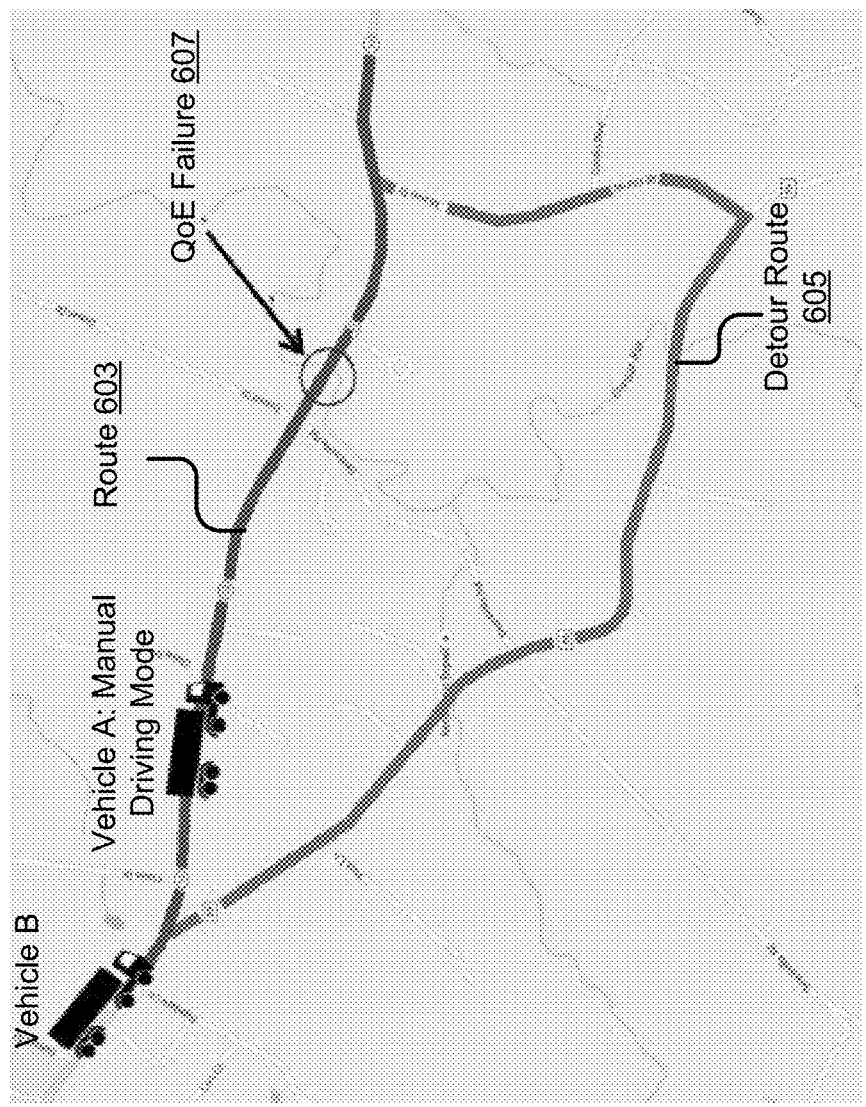
FIGS. 6A-6B are graphical representations illustrating an example of a routing management according to some embodiments.
Figure 6B:
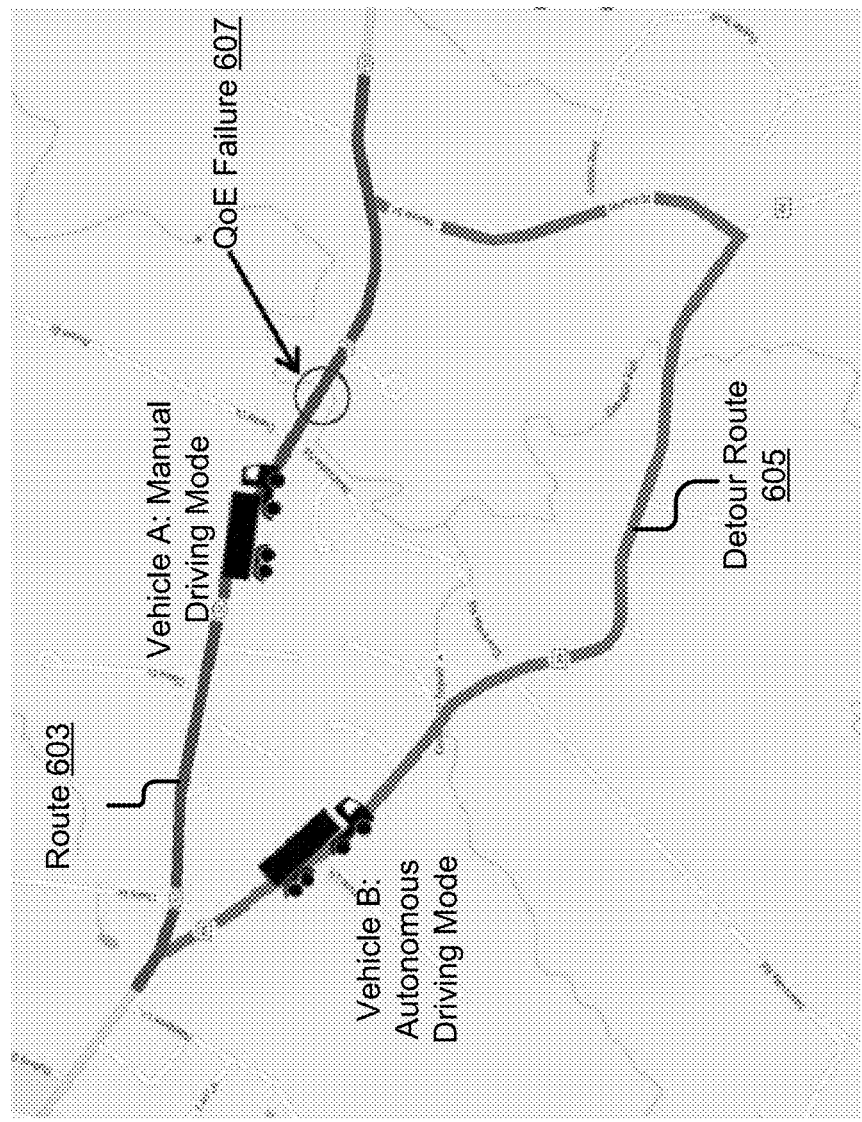

FIGS. 6A-6B are graphical representations 600 and 620 illustrating an example of a routing management according to some embodiments. Turning to FIG. 6A, the QoE monitoring system 193 detects a QoE failure 607 of a requested service on a route 603 of a vehicle A. Then, the QoE-aware navigation system 194 makes a management decision for the vehicle A to change the vehicle A from an autonomous driving mode to a manual driving mode that does not rely on the requested service. Responsive to receiving the management decision from the QoE-aware navigation system 194, the management client 199 of the vehicle A modifies an operation of a vehicle control system of the vehicle A so that the vehicle A changes to the manual driving mode. The vehicle A continues to travel on the route 603.

With respect to a vehicle B that plans to travel along the route 603, the QoE-aware navigation system 194 makes a management decision to assign a detour route 605 to the vehicle B. Turning to FIG. 6B, responsive to receiving the management decision, the management client 199 of the vehicle B may modify a navigation route of the vehicle B from the route 603 to the detour route 605. The vehicle B may operate in an autonomous driving mode with access to the requested service for the autonomous driving.

Figure 7A:
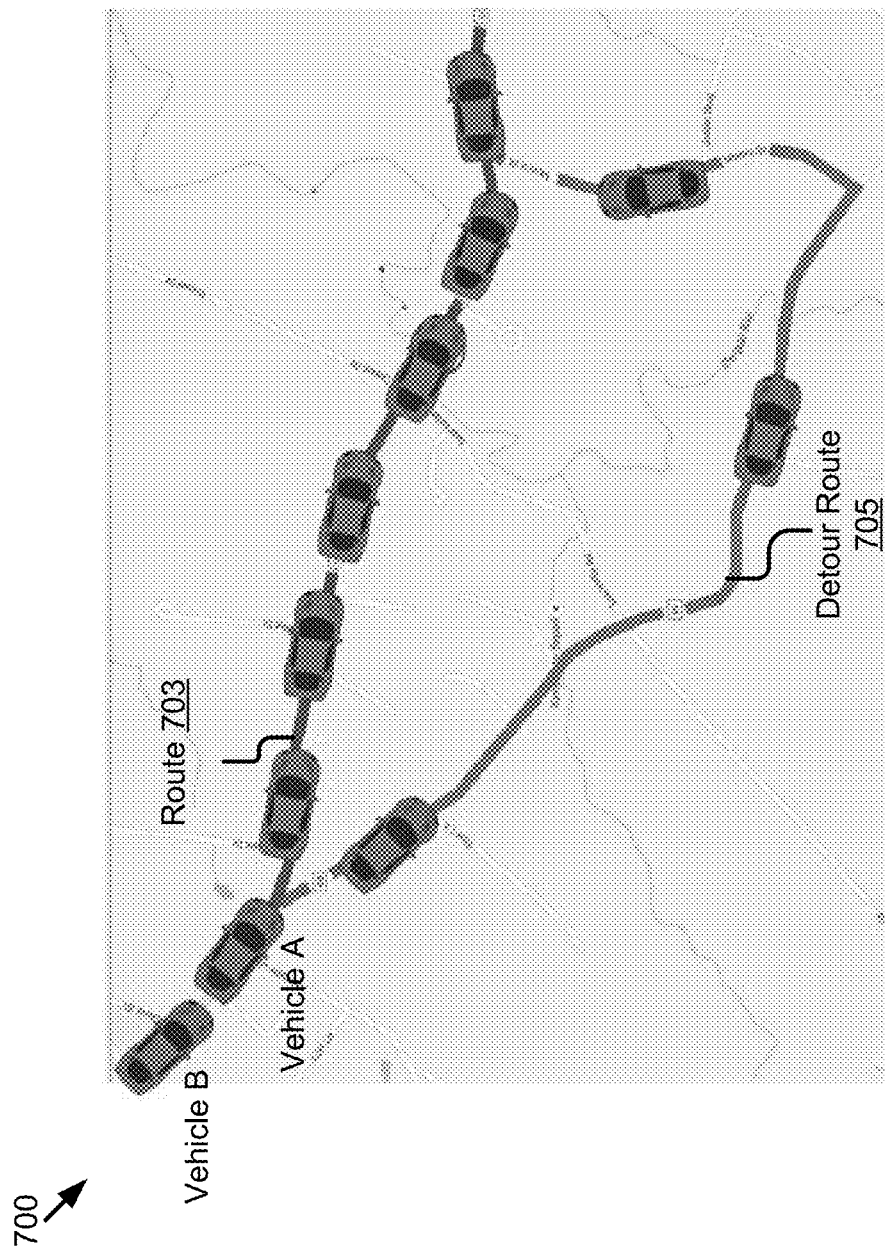
FIGS. 7A-7B are graphical representations illustrating another example of a routing management according to some embodiments.
Figure 7B:
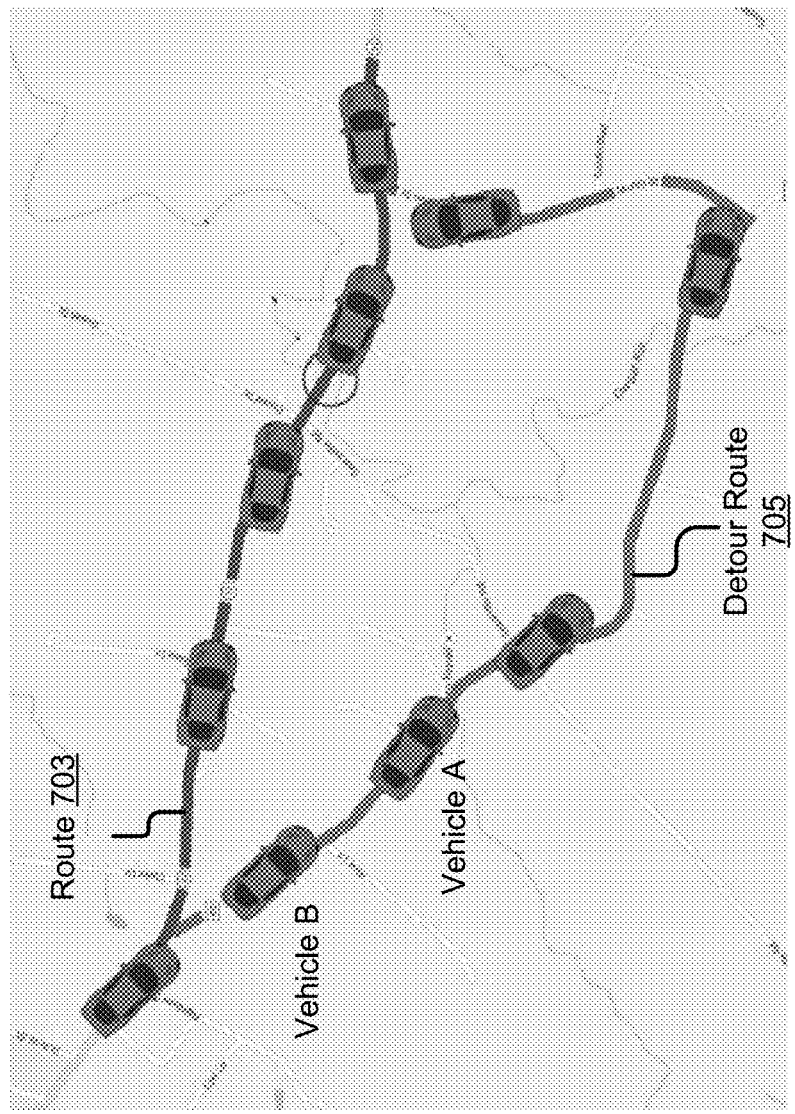

FIGS. 7A-7B are graphical representations 700 and 720 illustrating another example of a routing management according to some embodiments. Turning to FIG. 7A, a workload level for a route 703 reaches 60% of a full workload amount that can be provided on the route 703. A workload level for a detour route 705 reaches 30% of a full workload amount that can be provided on the detour route 705. In this case, the QoE-aware navigation system 194 may proactively balance traffic across the route 703 and the detour route 705 to improve QoE levels of vehicles on each route.

For example, with respect to a vehicle A and a vehicle B that are planning to enter the route 703, the QoE-aware navigation system 194 may make a first management decision for the vehicle A and a second management decision for the vehicle B respectively. The first management decision and the second management decision are configured to direct the vehicle A and the vehicle B to travel along the detour route 705 instead of the route 703, respectively (see, e.g., FIG. 7B). Responsive to receiving the first management decision, the management client 199 of the vehicle A may modify an operation of the vehicle control system of the vehicle A to travel along the detour route 705. Similarly, responsive to receiving the second management decision, the management client 199 of the vehicle B may modify an operation of the vehicle control system of the vehicle B to travel along the detour route 705. In this way, the traffic on the route 703 and the traffic on the detour route 705 are balanced to avoid potential QoE failures that may occur on the route 703 or the detour route 705.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer program product comprising a non-transitory memory storing computer-executable code that, when executed by a processor, causes the processor to:
   determine a network transmission status of a first requested service in a service area of a connected vehicle based on an acknowledgement message received from the connected vehicle, wherein the connected vehicle is a member of a set of connected vehicles in the service area;
   determine a Quality of Experience (QoE) failure of the first requested service and a workload level for the first requested service in the service area of the connected vehicle based on the network transmission status, wherein the QoE failure indicates an overload of a server; and
   restore a QoE level for the first requested service in the service area by selecting a subset of the set of connected vehicles in the service area to deliver the first requested service in the service area using their own computing resources, wherein the subset is configured to be sufficient to restore a required QoE level for the first requested service and the subset prioritizes providing the first requested service to autonomous vehicles that depend of the first requested service.

2. The computer program product of claim 1, wherein determining the network transmission status includes:
   providing a second requested service to the connected vehicle;
   receiving the acknowledgement message including a time of receipt from the connected vehicle; and
   determining the network transmission status based on whether the time of receipt was received within an expected delay.

3. The computer program product of claim 1, wherein the computer-executable code further causes the processor to transmit a Vehicle-to-Everything (V2X) message to the connected vehicle that includes a management decision that instructs the connected vehicle to change from an autonomous driving mode to a manual driving mode that does not rely on the first requested service.

4. The computer program product of claim 1, wherein the computer-executable code further causes the processor to:
   aggregate data that includes one or more of a traffic condition in the service area, a QoE status of the first requested service in the service area, the workload level of the first requested service in the service area, QoE statuses and workload levels of the first requested service in different service areas, a QoE-failure prediction for each of the different service areas, or a profile of the first requested service accessed by the connected vehicle; and
   make a management decision for the connected vehicle based on aggregated data.

5. A computer-implemented method, comprising:
   determining a network transmission status of a first requested service in a service area of a connected vehicle based on an acknowledgement message received from the connected vehicle, wherein the connected vehicle is a member of a set of connected vehicles in the service area;
   determining a Quality of Experience (QoE) failure of the first requested service and a workload level for the first requested service in the service area of the connected vehicle based on the network transmission status, wherein the QoE failure indicates an overload of a server; and restoring a QoE level for the first requested service in the service area by selecting a subset of the set of connected vehicles in the service area to deliver the first requested service in the service area using their own computing resources, wherein the subset is configured to be sufficient to restore a required QoE level for the first requested service and the subset prioritizes providing the first requested service to autonomous vehicles that depend of the first requested service.

6. The method of claim 5, wherein determining the network transmission status includes:

providing a second requested service to the connected vehicle;

receiving the acknowledgement message including a time of receipt from the connected vehicle; and determining the network transmission status based on whether the time of receipt was received within an expected delay.

7. The method of claim 5, further comprising transmitting a Vehicle-to-Everything (V2X) message to the connected vehicle that includes a management decision that instructs the connected vehicle to tune one or more software settings of a vehicle control system so that the vehicle control system operates in a manner that minimizes the workload level of the first requested service in the service area and improves the QoE level experienced by the connected vehicle.

8. The method of claim 5, further comprising transmitting a Vehicle-to-Everything (V2X) message to the connected vehicle that includes a management decision that instructs the connected vehicle to perform a routing management to optimize the QoE level.

9. The method of claim 8, wherein:

the QoE failure occurs in the service area; and the routing management includes advising the connected vehicle to operate in a different mode that does not depend on the first requested service.

10. The method of claim 8, wherein the routing management is performed to balance a future workload of the first requested service in one or more service areas to avoid a potential future QoE failure that occurs in the one or more service areas.

11. The method of claim 8, wherein the routing management causes one or more computing resources along a route of the connected vehicle to be utilized in a manner that modifies safety.

12. The method of claim 5, wherein the autonomous vehicles pose a safety threat when they are not provided the first requested service.

13. The method of claim 12, further comprising selecting the connected vehicle to provide the first requested service based on one or more priority factors that include one or more of the following: a vehicle duty of the connected vehicle; a dependency of the connected vehicle on the first requested service; or a behavior pattern of a driver of the connected vehicle.

14. A system comprising:

an onboard vehicle computer system of a connected vehicle including a non-transitory memory storing computer code which, when executed by the onboard vehicle computer system, causes the onboard vehicle computer system to:

determine a network transmission status of a first requested service in a service area of a connected vehicle based on an acknowledgement message received from the connected vehicle, wherein the connected vehicle is a member of a set of connected vehicles in the service area;

determine a Quality of Experience (QoE) failure of the first requested service and a workload level for the first requested service in the service area of the connected vehicle based on the network transmission status, wherein the QoE failure indicates an overload of a server; and restore a QoE level for the first requested service in the service area by selecting a subset of the set of connected vehicles in the service area to deliver the first requested service in the service area using their own computing resources, wherein the subset is configured to be sufficient to restore a required QoE level for the first requested service and the subset prioritizes providing the first requested service to autonomous vehicles that depend of the first requested service.

15. The system of claim 14, wherein the connected vehicle transmits the acknowledgement message based on receiving a second requested service from the server, wherein the acknowledgement message includes a time of receipt.

16. The system of claim 14, wherein the non-transitory memory stores additional computer code that is operable, when executed by the onboard vehicle computer system, to cause the onboard vehicle computer system to tune one or more software settings of a vehicle control system so that the vehicle control system operates in a manner that minimizes the workload level of the first requested service in the service area and improves a QoE level experienced by the connected vehicle.

17. The system of claim 14, wherein the non-transitory memory stores additional computer code that is operable, when executed by the onboard vehicle computer system, to cause the onboard vehicle computer system to perform a routing management on the connected vehicle to optimize a QoE level experienced by the connected vehicle.

18. The system of claim 17, wherein:

the QoE failure occurs in the service area; and the routing management includes advising the connected vehicle to operate in a different mode that does not depend on the first requested service.

19. The system of claim 17, wherein the routing management is performed to balance a future workload of the first requested service in one or more service areas to avoid a potential future QoE failure that occurs in the one or more service areas.

20. The system of claim 14, wherein the non-transitory memory stores additional computer code that is operable, when executed by the onboard vehicle computer system, to cause the onboard vehicle computer system to select the connected vehicle to provide the first requested service so that a potential safety risk in a roadway environment is reduced.

* * * * *